Patented May 6, 1952

2,595,215

UNITED STATES PATENT OFFICE 2,595,215

PHENOTHIAZINE DERIVATIVES AND PROCESS FOR THEIR PREPARATION

Paul Charpentier, Choisy-le-Roi, France, assignor to Societe des Usines Chimiques Rhone Poulenc, Paris, France, a French body corporate No Drawing. Application April 5, 1951, Serial No. 219,519. In France May 23, 1950

7 Claims. (Cl. 260—243)

This invention concerns new phenothiazine derivatives and a process for their preparation.

It is an object of the present invention to provide new phenothiazine derivatives having useful therapeutic properties.

The new phenothiazine derivatives of the present invention conform to the general formula:

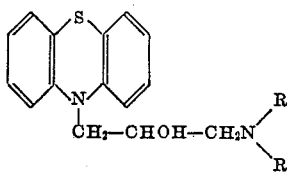

in which R represents a lower alkyl group.

According to a feature of the present invention, these new compounds are obtained by condensing a secondary amine R-NH-R with N-(2':3'-epoxypropyl)-phenothiazine. In practice, this condensation is preferably effected at elevated temperature and pressure (for example, the reactants may be heated to a temperature of about 120° C. in a sealed tube or autoclave) and conveniently in the presence of a diluent such as 90% ethyl or methyl alcohol. The N-(2':3'-epoxypropyl)-phenothiazine employed as starting material is itself obtained for example by the action of epichlorhydrin on an alkali metal derivative of phenothiazine such as its lithium derivative.

The new phenothiazine derivatives possess interesting pharmacological properties. In particular they can be employed as spasmolytics, antihistaminics, vagolytics and as local anaesthetics which renders them useful in human and veterinary medicine. In addition, they may be used as intermediates for the preparation of other physiologically interesting substances.

The following non-limitative examples illustrate how the invention may be put into practice.

Example I

To 12.7 g. of N-(2':3'-epoxypropyl)-phenothiazine there is added a solution of 11 g. of diethylamine in 15 g. of 90% ethyl alcohol. The mixture is heated for 8 hours at 120° C. in a sealed tube; then the excess diethylamine and alcohol is driven off by heating on a water bath, and the residue is taken up in benzene. N-(3'-diethylamino - 2' - hydroxypropyl) - pheno - thiazine crystallises, which, on recrystallisation from alcohol, melts at 142–143° C. Its hydrochloride has a melting point of about 134° C.

The N-(2':3'-epoxypropyl)-phenothiazine employed as starting material is obtained in the following manner: 20 g. of phenothiazine are dissolved in an ethereal solution of lithium phenyl prepared from 2 g. of lithium and 23 g. of bromobenzene. Over a period of one and a half hours, 14 g. of epichlorhydrin are added, the temperature being maintained at around 0° C. The mixture is allowed to return to ordinary temperature and left overnight. It is then taken up in water; the ethereal layer separated and dried over sodium sulphate. The ether is driven off and the residue is utilised for the reaction.

Example II

To 12.7 g. of N-(2':3'-epoxypropyl)-phenothiazine there is added a solution of 7 g. of dimethylamine in 15 g. of 90% methyl alcohol. The mixture is heated for 12 hours at 120° C. in a sealed tube; then the excess of dimethylamine and alcohol is driven off by heating on a water bath. The residue is taken up in dilute hydrochloric acid. The neutral products removed by extraction with benzene, and then the free N-(3'-dimethylamino - 2' - hydroxypropyl) - pheno - thiazine is obtained by the addition of caustic soda solution and extraction with ether. After recrystallisation from a mixture of ethyl acetate and petroleum ether, the N-(3'-dimethylamino-2'-hydroxypropyl)-phenothiazine melts at 84–85° C. Its hydrochloride has a melting point of about 131° C.

I claim:

1. Phenothiazine derivatives conforming to the general formula:

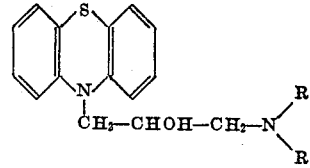

in which R represents a lower alkyl group.

2. N - (3' - diethylamino - 2' - hydroxypropyl)-phenothiazine.

3. N - (3' - dimethylamino - 2' - hydroxypropyl)-phenothiazine.

4. A process for the preparation of new phenothiazine derivatives of the general formula:

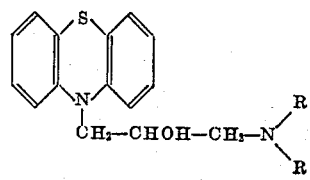

which comprises heating a secondary amine R-

NH-R (where R represents a lower alkyl group) with N-(2':3'-epoxypropyl)-phenothiazine.

5. A process as claimed in claim 4 in which the heating is effected in a diluent at elevated pressure.

6. A process for the preparation of N-(3'-diethylamino-2'-hydroxypropyl)-phenothiazine in which diethylamine is heated with N-(2':3'-epoxypropyl)-phenothiazine in alcoholic medium in a closed vessel at a temperature of not less than about 120° C.

7. A process for the preparation of (N-3'-dimethylamino-2'-hydroxypropyl)-phenothiazine in which dimethylamine is heated with N-(2':3'-epoxypropyl)-phenothiazine in alcoholic medium in a closed vessel at a temperature of not less than 120° C.

PAUL CHARPENTIER.

No references cited.